June 7, 1927.
G. WASHINGTON
1,631,300
SHUTTER MECHANISM FOR CAMERAS
Filed Feb. 1, 1926
4 Sheets-Sheet 1
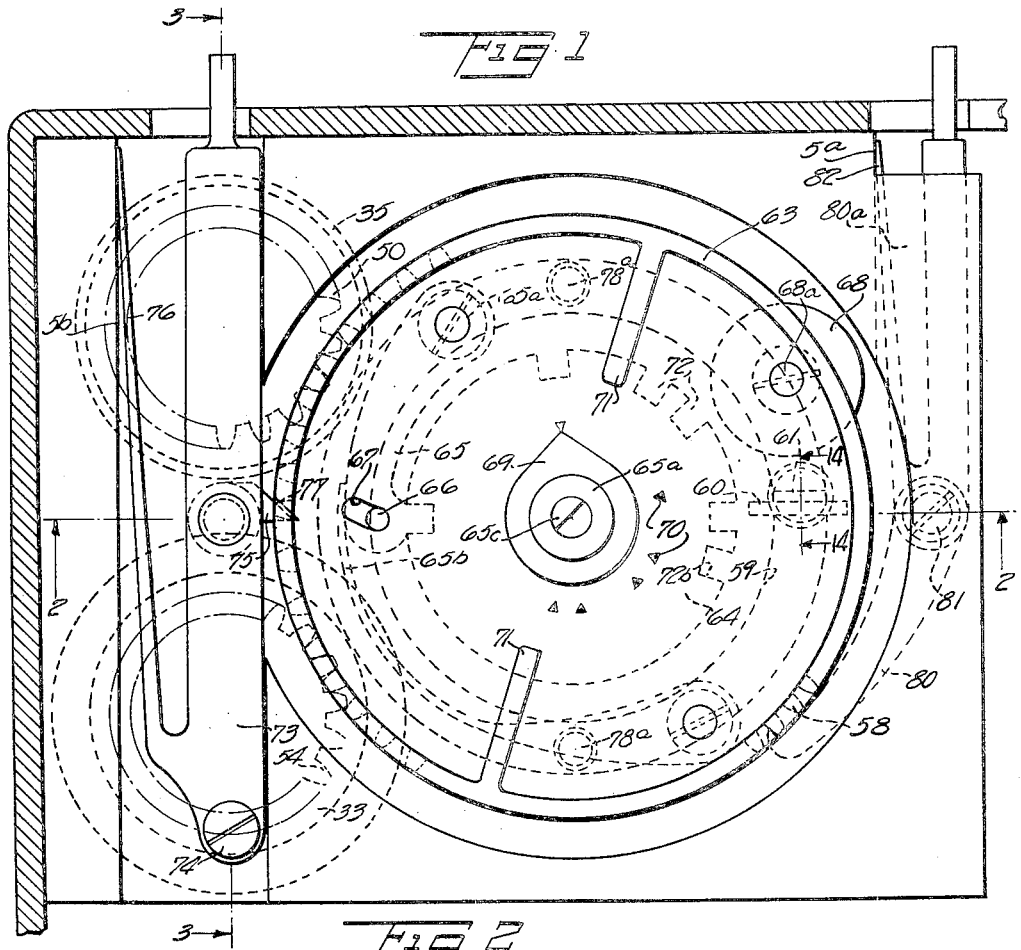
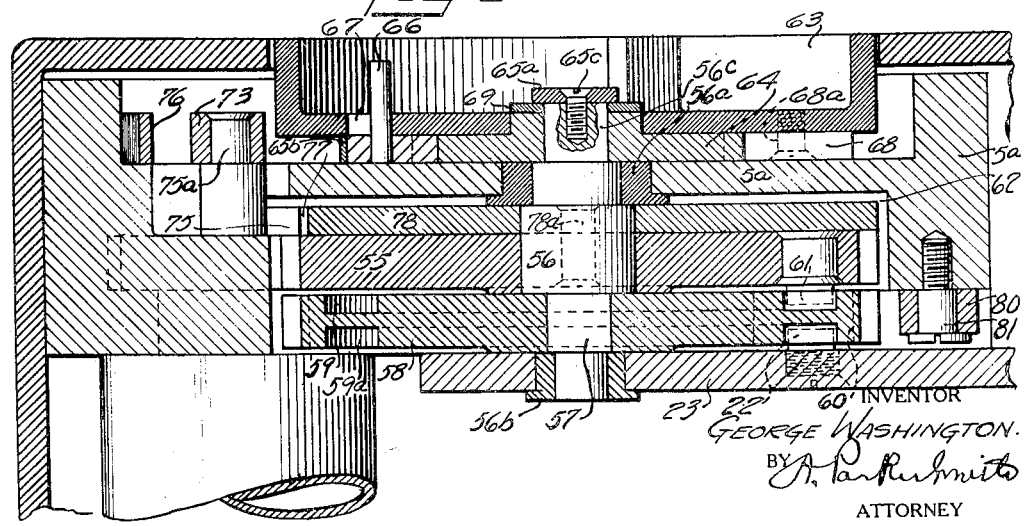
INVENTOR
GEORGE WASHINGTON.
BY
ATTORNEY June 7, 1927.  1,631,300
G. WASHINGTON
SHUTTER MECHANISM FOR CAMERAS
Filed Feb. 1, 1926  4 Sheets-Sheet 2
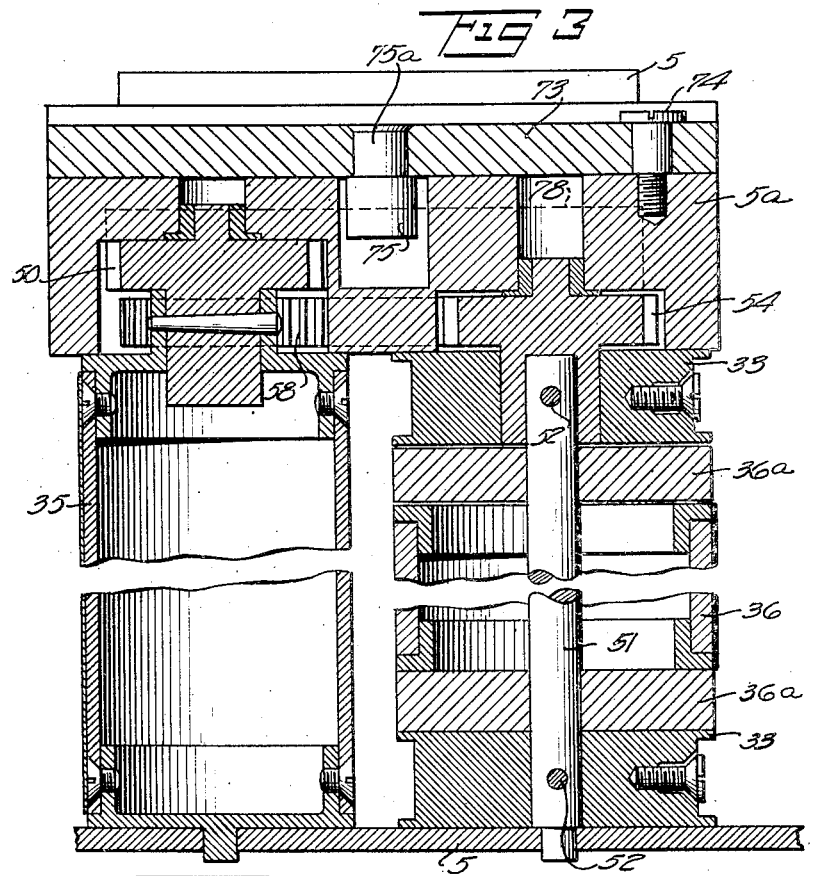
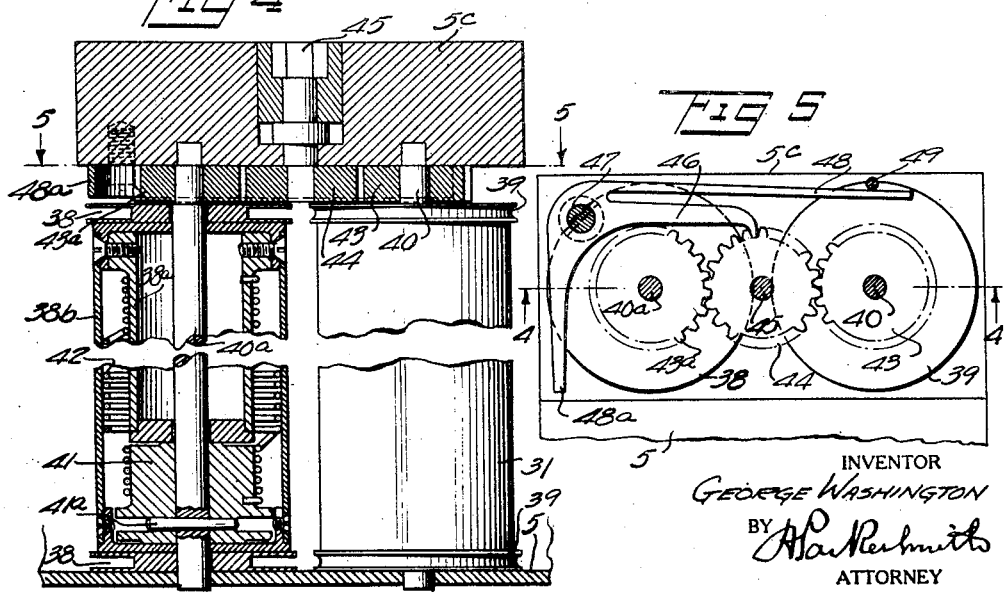
INVENTOR
GEORGE WASHINGTON
BY
ATTORNEY

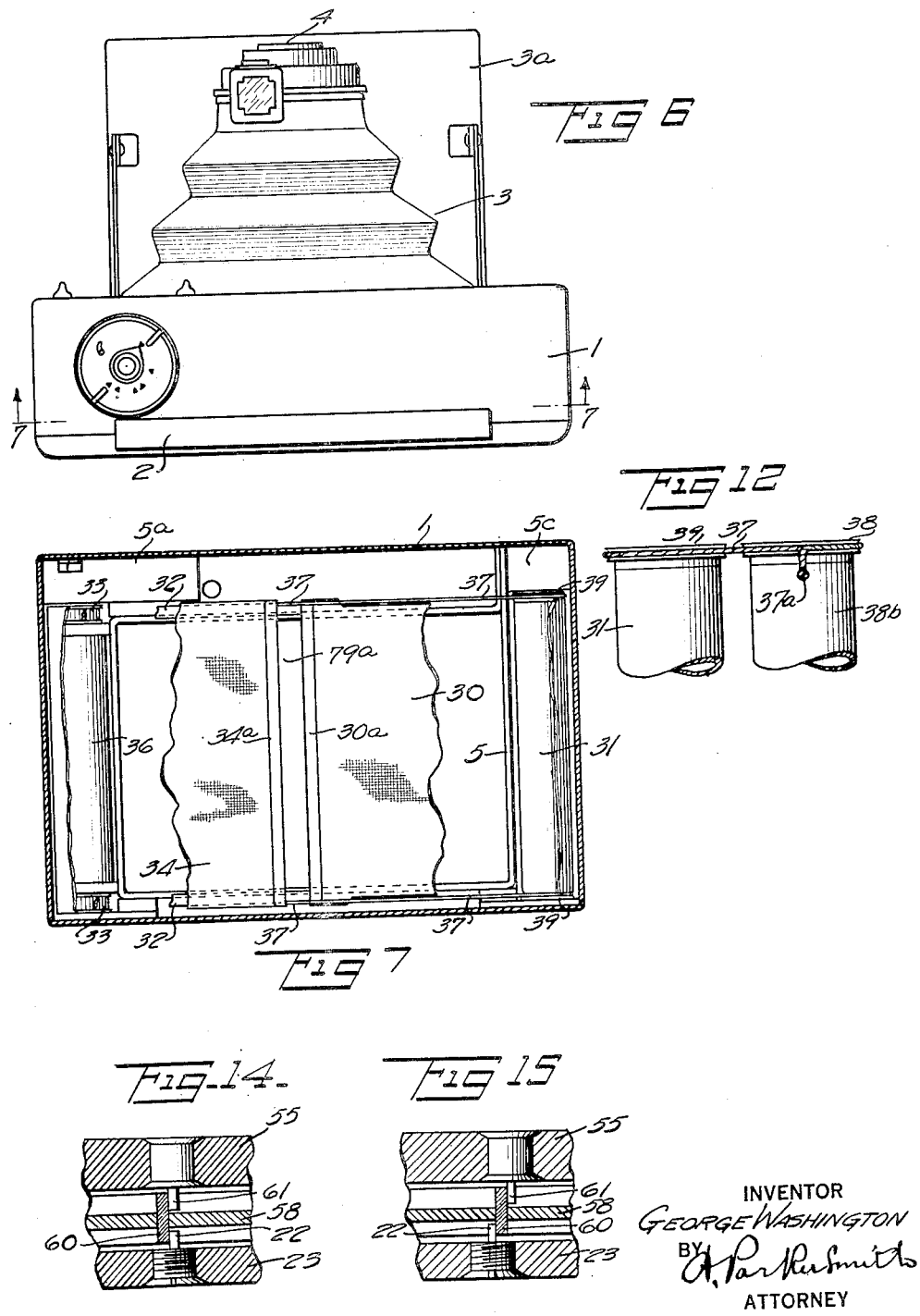

June 7, 1927.
G. WASHINGTON
1,631,300
SHUTTER MECHANISM FOR CAMERAS
Filed Feb. 1, 1926     4 Sheets-Sheet 4
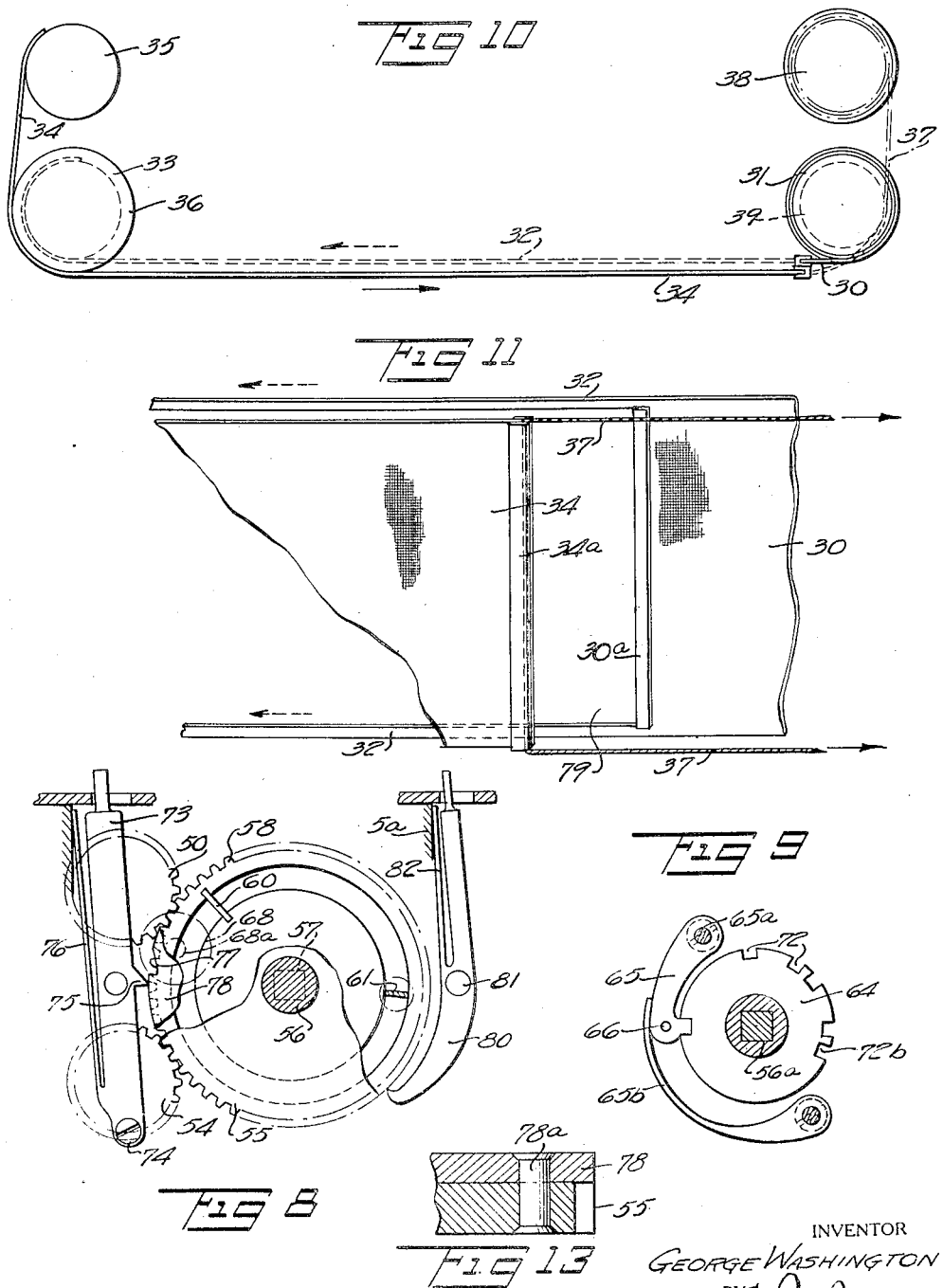
INVENTOR
GEORGE WASHINGTON
BY
ATTORNEY Patented June 7, 1927.

1,631,300

UNITED STATES PATENT OFFICE.

GEORGE WASHINGTON, OF BROOKLYN, NEW YORK.

SHUTTER MECHANISM FOR CAMERAS.

Application filed February 1, 1926. Serial No. 85,129.

My invention is primarily designed to produce a small, compact pocket camera usable with films or dry plates, and which shall have practically all the advantages of large cameras now in use, except the ability to take large pictures, and, as to this point, will be capable of taking photographs with such accuracy of detail that they may be enlarged many times without losing sharpness of outline.

To this end my invention so far as herein described comprises an automatic shutter mechanism accurately adjustable for widely different ranges of exposures and various other improvements in details of construction which will be evident on reading the subjoined description thereof.

The best form of apparatus at present known to me embodying my invention is illustrated in the accompanying four sheets of drawings in which:

Fig. 1 is a plan view of the curtain setting and releasing apparatus, a portion of the casing being shown in section.

Fig. 2 is a vertical cross section of the same on line 2—2 of Fig. 1, parts being broken away.

Fig. 3 is another vertical cross section taken on line 3—3 of Fig. 1, parts being broken away.

Fig. 4 is a vertical cross section taken on line 4—4 of Fig. 5 showing the shutter curtain take-up or winding rollers and sheaves, parts being broken away.

Fig. 5 is a horizontal cross section taken on line 5—5 of Fig. 4, parts being broken away.

Fig. 6 is a plan view on a reduced scale of the complete camera with the lens in position for taking a picture.

Fig. 7 is a vertical section on line 7—7 of Fig. 6, the curtains being broken away in part to show the rollers on which they are wound.

Fig. 8 is a detail view of the shutter setting and tripping mechanism in the position reached just after the follow-up curtain has been released, parts being broken away and others shown in section on different planes.

Fig. 9 is a detail of the adjusting mechanism for the trip mechanism shown in Fig. 8.

Fig. 10 is a diagram of the shutter curtains and their supporting members.

Fig. 11 is a rear elevation of said curtains in action when set for a longer exposure than that shown in Fig. 7, parts being broken away.

Fig. 12 is a detail of the curtain take-up or winding rollers looking at the sides thereof opposite from those shown in Fig. 4, and showing one actuating cord for the follow-up curtain, parts being broken away.

Fig. 13 is a detail cross section, broken away, of parts of one gear and attached plate of the curtain setting and releasing mechanism.

Fig. 14 is a detail section on line 14—14 of Fig. 1 and Fig. 15 is a similar view showing the parts in the positions assumed after an exposure has been made and before the shutter has been rewound and set.

Throughout the drawings like reference characters refer to like parts. A suitable general construction of camera indicated in Fig. 6 comprises the usual casing 1, in which are mounted the film rollers (not shown) or a plate holder indicated at 2, which may be of any approved construction, and the collapsible bellows extension 3 carrying at its outer end, when extended, an adjustable objective lens 4, these parts constituting no part of my present invention, but being of the general type described and claimed in part in my copending application Serial No. 85,127 filed of even date herewith. When these parts are adjusted as indicated in Fig. 6, and the shutter (hereinafter to be described) is operated, the desired exposure of a portion of the film or plate will be produced and the objects in the field covered by the lens 4 will be photographed on the exposed portion of said film or plate. When the extension 3 is collapsed and the flap 3ª swung up, the camera then forms a thin, small package which may be easily carried in the operator's pocket.

As shown in the drawings the preferred form of shutter mechanism comprises generally two curtains adapted to be set so that one, which I will call the main curtain, is unwound from a spring roller and extends over the face of the photographic film or plate, protecting the sensitized surface thereof from the light rays entering through the adjustable lens 4, while the other, which I will call the follow-up curtain, is wound up on a setting roller, ready to be unwound therefrom and to follow the main curtain across the face of the film or plate at an adjustable predetermined distance behind said main curtain when the two curtains are released and the main curtain rewound on its spring roller. The length of the open space between the rear end of the moving main curtain and the forward edge of the moving follow-up curtain, determines the period of time during which any given point on the photographic surface within the field of the lens 4 is exposed to the action of the light rays, both curtains moving at the same speed while both are crossing said lens field; but the starting of the follow-up curtain being more or less delayed by an adjustable, automatic releasing device according to what length of time of exposure of the sensitized surface may be desired.

In the drawings 30 is the main curtain (see Figs. 7, 10 and 11) adapted to be wound up on its spring roller 31 when traveling from left to right as shown by the full line arrows in Figs. 10 and 11. Said roller 31 is journaled on frame 5 near the right hand end of casing 1 (Figs. 4, 5 and 7). Said main curtain 30 may be unwound from spring roller 31 (when the shutter mechanism is set) by tension of ribbons 32, 32, attached to the corners of its rear edge, said tension being applied toward the left in the direction of the dotted arrows in Figs. 10 and 11, by winding said ribbons on setting and releasing sheaves 33 located near the left hand end of said casing 1, and also journaled on frame 5. The follow-up curtain 34, when the shutter is set, is wound up on the setting and releasing roller 35 (Figs. 3 and 10), journaled on frame 5, near the left hand end of casing 1. The forward end of said follow-up curtain 34 then extends around idler roller 36 (Figs. 3, 7 and 10) freely mounted on shaft 51 carrying sheaves 33, and it is caused to follow the main curtain 30 over the photographic film or plate (when released) by the tension of cords 37, 37, attached to the corners of its forward edge, said cords passing around idler sheaves 39, 39, (Figs. 4 and 7) freely mounted on the shaft 40 on which main curtain roller 31 is spring mounted, and being wound up on sheaves 38, 38, (Figs. 4, 10 and 12) which are fast on either end of spring driven barrel 38ᵇ, journaled near the right hand end of casing 1 on frame 5, back of said main curtain roller 31 (looking at Figs. 7 and 10). In Fig. 10 the parts are shown in the position reached after the shutter mechanism has been operated and the photograph taken. In Fig. 11 the two curtains are shown in the act of traveling across the field of lens 4, the space 79 between them representing the area of the film exposed at any one instant. In Fig. 7 the shutter is also shown in operation but with a narrower space 79ᵃ between the curtains, producing a shorter exposure of the sensitized surface to the light rays coming through lens 4. 30ᵃ is a stiffening strip for the free rear end of main curtain 30, and 34ᵃ is a similar stiffening strip for the free, forward end of follow-up curtain 34.

The spring mechanism for winding up main curtain 30 and unwinding follow-up curtain 34 is illustrated in Figs. 4 and 5. Spring driven take-up sheaves 38 for cords 37 connected to follow-up curtain 34 are loosely mounted on shaft 40ᵃ to which hub 41 is fastened by pin 41ᵃ. This hub serves as an anchorage for one end of coiled spring 42, the other and upper end thereof being fastened to the cylinder 38ᵃ, which in turn is fastened to the inside of the hollow cylinder 38ᵇ, to the ends of which sheaves 38 are fastened. Gear 43ᵃ is fast on the upper end of shaft 40ᵃ and meshes with gear 44 on winding shaft 45. Gear 44 is held in adjusted position by pawl 46, pivoted to frame 5 in block 5ᶜ at 47 and held in engagement with gear 44 by spring extension 48 resting against fixed pin 49. In the same way roller 31, to which main curtain 30 is attached at its forward end, is loosely mounted on, and spring connected to, shaft 40, by an interior coiled spring (not shown) and on the upper end of shaft 40 is gear 43 which also meshes with gear 44. A rigid projection 48ᵃ from pawl 46 can be reached by the operator through an opening in the casing to trip the pawl if it is desired to relieve the tension of these winding springs. By either winding up the shaft 45 in a clockwise direction (looking at Fig. 5) to increase the spring tension, or by releasing the pawl and allowing shaft 45 to rotate in a counterclockwise direction, the tension of the actuating springs can be regulated. Cords 37 may be fastened to barrel 38 by means of screws, one of which is shown at 37ᵃ in Fig. 12. The tension of springs 42 may be adjusted by initially winding them up by a key applied to the squared end of shaft 45. They will act from pawl 46 as an anchorage to produce independent tension on sheaves 38 and roller 31 tending always to roll up main curtain 30 and to unroll follow-up curtain 34.

The shutter setting and releasing mechanism is shown assembled in Figs. 1, 2 and 3, and in detail in Figs. 8 and 9. This setting and releasing mechanism consists generally of two gears 55 and 58 which are mounted concentrically one with another on or around shaft 56. Gear 55 meshes with a pinion 50 (see Figs. 1 and 2) fast on follow-up curtain setting roller 35, and gear 58 meshes with pinion 54 which is rigidly connected with the sheaves 33, 33, on which ribbons 32 from main curtain 30 are wound. This shaft 56 is journaled in bearing 56ᵃ in bearing block 5ᵃ, and in bearing 56ᵇ set in fixed plate 23 which may be a part of 5ᵃ (see Fig. 2). Gear 58 is fast on shaft 56, being mounted on the squared portion 57 thereof. Gear 55 rotates freely on shaft 56 but has a connection with gear 58 by which it may be driven by the latter in a counterclockwise direction looking at Fig. 1. This connection comprises a pin 61 projecting from the lower surface of gear 55 into a groove 59 in the upper surface of gear 58 and cooperating with a stop 60 which stretches across said groove 59. 59ª is a similar groove in the under face of gear 58, across which stop 60 also extends to cooperate with pin 22, set in fixed plate 23 and projecting into said groove to limit the curtain setting rotation of gears 55 and 58, to one nearly complete revolution. On the upper end of shaft 56 is fastened the cupped disc 63 loosely held on the end of shaft 56 by plate 65ª and screw 65ᵇ (Fig. 2).

It is evident that when this disc 63 is rotated in a counterclockwise direction (looking at Fig. 1) gear 58 will rotate with it and, as the stop 60 thereon is in contact with pin 61, movement of disc 63 in a counterclockwise direction will also be transmitted to gear 55. Such motion of cupped disc 63 is therefore transmitted simultaneously to roller 35, to wind up and set follow-up curtain 34 through pinion 50 fast on said roller and meshing with gear 55, and also to sheaves 33, 33 for winding up ribbons 32 and thereby unwinding and setting main curtain 30, the motion being transmitted to said sheaves 33, 33, through pinion 54 on shaft 51, said pinion meshing with the lower gear 58. Pinion 54, sheaves 33, and shaft 51, are held together by pins 52 (Fig. 3). This system of gearing is held in shutter setting position by pawl 80, pivoted to block 5ª, at 81, and held in engagement with gear 58 by spring extension 82 bearing on the side wall of the recess 80ª, in the block 5ª, in which said pawl is mounted, as best shown in Figs. 1 and 8. When said pawl is released, by swinging its projecting end to the left (looking at Figs. 1 and 8), gear 58 and consequently sheaves 33 are left free to rotate and main curtain 30 thereupon starts winding up on its spring roller 31, traveling from left to right (Figs. 7, 10 and 11) and beginning to expose the film to the light rays entering through lens 4.

The means for releasing gear 55 so that it may at the desired moment start to follow gear 58 and consequently permit follow-up curtain 34 to begin to follow main curtain 30 comprises the pawl 75 engaging notch 77 in circular disc 78; which disc is fastened to the upper side of gear 55, as by rivet 78ª (Fig. 13), this plate and the two gears 55, 58, being nested in space 62 cut out of the lower side of block 5ª, as best shown in Fig. 2. Pawl 75 is carried on the under side of lever 73 by means of the rivet 75ª and is spaced away therefrom far enough so as to lie in the plane of the disc 78 as shown in Fig. 2. Lever 73, however, lies in the plane of rotation of the anti-friction wheel or button 68 fastened to the under side of cup 63 by screw 68ª. Consequently when cup 63 rotates far enough to bring anti-friction wheel 68 in contact with lever 73 the latter will be pushed to the left against the resistance of spring 76 and carry with it pawl 75 so as to free it from the notch 77 in disc 78 and thereby release gear 55 so that it may rotate under the pull of gear 50 which is fast on roller 35, which latter is under the tension of follow-up curtain 34, thus permitting follow-up curtain 34 to start on its movement in pursuit of main curtain 30 which is already being wound up with its rear end traveling across the lens field as indicated by the full line arrows in Fig. 11.

The means for timing this movement of pawl 75 comprises mechanism for adjusting circumferentially the position of the cup 63, and the anti-friction wheel 68 carried thereby, with reference to shaft 56, which latter rotates with gear 58 and therefore moves synchronously with the main curtain 30. The preferred means for producing this adjustment herein illustrated comprises the disc 64 set on the squared upper portion 56ᶜ of shaft 56 and provided with a series of notches 72, 72 which may be engaged by a pawl 65 (see Fig. 9) pivoted at 65ª on the under side of cup 63. This pawl is held in engagement by spring 65ᶜ also fastened to the under side of cup 63 and has an upwardly projecting pin 66 passing through a slot 67 in cup 63. By pulling pawl 65 out of engagement with any of the notches 72 and rotating the cup, said pawl can be allowed to drop into any other notch and so determine the angular advance or retardation of friction wheel 68 with reference to shaft 56. If the pawl 65 engages the particular notch with which it is shown in engagement in Figs. 1 and 9, it is evident that cup 63 must make nearly two-thirds of a revolution before wheel 68 will strike lever 73 and release the follow-up curtain, which will result in a long exposure of the film or plate. If, on the other hand, pawl 65 is shifted over into engagement with notch 72ᵇ, the friction wheel 68 will be located very close to lever 73 when the shutter is set, and will strike said pawl before cup 63 has rotated through more than a few degrees, with the result that the follow-up curtain will then be released soon after the main curtain has begun to move, and only a narrow open space 79ª will be left between the two curtains as they are traveling across the field of the lens as indicated in Fig. 7. If pawl 65 were dropped into one of the intermediate notches 72 then an opening of intermediate extent would exist between the two curtains while they were traveling across the field of the lens, as indicated at 79 in Fig. 11. In all cases, the period of exposure of the film will vary directly as the width of the space 79 or 79ª.

Idler roller 36 is separated from sheaves 33 by intermediate members 36ª shown in Fig. 3 so that motion of either may not be transmitted to the other by frictional contact.

The proper setting of pawl 65 in the proper notch 72 to produce an exposure of a given fraction of a second may be indicated by a pointer 69 (Figs. 1 and 2) fast on the upper end of shaft 56 and swinging over the division points 70, marked on the upper surface of cup 63. Short radial ribs 71, 71, on the upper surface of cup 63 serve as convenient means for grasping said cup for this adjustment and also when winding up the shutter setting mechanism.

The complete operation of setting and releasing the shutter mechanism for any desired time exposure therefore is as follows: Locking pawl 65 is first dropped into engagement with that notch 72 which will give the desired exposure. This also locks cupped disc 63 to shaft 56 so that the operator may grasp the cup by ribs 71, 71, and rotate the cup disc 63, shaft 56, and gear 58 in a counterclockwise direction, beginning the unwinding of main curtain 30 from its spring roller 31 and drawing it across the field of the lens in the direction of the dotted arrows in Figs. 10 and 11, and also (stop 60 in gear 58 being in contact with pin 61 on gear 55), simultaneously winding up follow-up curtain 34 on its roller 35. It is obvious that when the shutter parts are in the released position assumed after an exposure, the stop 60 is (as shown in Fig. 15) bearing against the side of fixed pin 22 opposite to that against which it is shown as bearing in Figs. 1 and 17 which show the set position, with the shutter ready to be released for an exposure.

One complete revolution of the gears 55 and 58 in a counterclockwise direction completes the unwinding of curtain 30 from its spring roller 31 and the winding up of curtain 34 on its setting roller 35, and brings the parts into position shown in Fig. 1, pin 22 serving as a stop for this winding-up operation. Thereupon pawl 75, dropping into notch 77 on disc 78, holds the follow-up curtain in such position, while main curtain 30 is held in unwound position by pawl 80. When pawl 80 is tripped by pushing its exposed end to the left the gear 58 is released and begins to rotate together with cup 63. The winding up of curtain 30 then starts and begins to expose the film, and whenever wheel or button 68 comes into contact with lever 73, pawl 75 is withdrawn from engagement with notch 77 in plate 78, gear 55 is also released, and follow-up curtain 34 also begins to move under tension of its cords 37 which are thereupon wound up on spring driven sheaves 38. The tensions of the springs driving roller 31 and sheaves 38 being substantially equal, the two curtains travel across the lens field at the same speed, and, after curtain 30 has been completely wound up stop 60 on gear 58 strikes the other side of fixed pin 22 (looking at Fig. 1) preventing further motion of said curtain. Curtain 34 continues to follow curtain 30 until notch 77 again comes opposite pawl 75, or pin 61 strikes stop 60, (as shown in Fig. 15) when its further movement is arrested with the parts in the position shown in Fig. 15, and with the two curtains in the position shown in Fig. 10. The position of the timing parts just after pawl 75 has been tripped and the follow-up curtain has begun to move are shown in Fig. 8. After pawl 75 has been withdrawn from notch 77 it rides on the periphery of disc 78, as also shown in Fig. 8.

If it is desired to release follow-up curtain 34 manually, instead of automatically, this can be done by pushing over the projecting end of lever 73. This enables the operator to make a time exposure by holding out pawl 65 thus disabling the automatic trip for curtain 34 and manually controlling the follow-up curtain by manipulating lever 73.

The combined mechanism for setting and adjusting the shutter above described is particularly compact and simple in operation and (as above explained) can be readily operated automatically for ordinary exposures, or manually controlled in cases where an extra long exposure is required.

Various changes evidently could be made in the details of the particular embodiments of the various sub-combinations herein illustrated and described without departing from the principle of the invention so far as the general method of operation and cooperation herein indicated is preserved.

Inasmuch as the speed of rotation of cupped disc 63 is substantially uniform for any given adjustment of tension of the spring which winds up main curtain 30, and such tension is adjustable as before described, it is evident that the automatic mechanism releasing follow-up curtain 34 is, in substance, a timing device for such curtain 34 and, as such, determines the period of time of exposure produced by the described shutter mechanism. The maximum limit of time of such automatic exposure is the total period of travel of the main curtain 30 because the projection 68 tripping pawl 75 can only be set back far enough to come into operative contact with pawl lever 73 at or just before the moment main curtain 30 has been completely wound up. To produce automatically any longer period of exposure, any standard form of adjustable time operatnig mechanism might be installed which could be employed to trip pawl 75 at some later period at a predetermined moment after main curtain 30 had been completely wound up. Whenever such added device were employed, the automatic exposure controlling device here shown would be disabled by holding out pawl 65 as before explained with manually controlled time exposures.

Having described my invention, I claim:

1. In a camera having a shutter mechanism comprising two spring actuated curtains adapted to follow one another across the field of the camera object lens, rollers for said curtain and means for winding and unwinding said curtains upon and from said rollers, the combination, with said above recited elements, of a curtain setting and releasing mechanism comprising a recessed base block in the outer face of which said curtain rollers are journalled, a short shaft journaled in the interior of said block, two gear wheels, one connected to each curtain roller and nested in a recess in said block, one of said gear wheels being fast on said shaft and the other loosely rotatable thereon, cooperating projections on said gear wheels by which the relative rotation thereof is limited to one revolution, a fixed stop for limiting the rotation of the gear fast on said shaft to one revolution, means mounted on the exterior end of said shaft for simultaneously rotating said gears to set the shutter curtains, a pawl for holding or releasing the gear which is fast on said shaft, a second pawl for holding or releasing the other gear, and automatic means moving with said first mentioned gear for releasing said second pawl.

2. A combination such as defined in claim 1 in which said automatic means for releasing said second pawl is circumferentially adjustable with reference to the shaft on which said first said mentioned gear wheel is fast.

3. A combination such as defined in claim 1 in which said gear fixed on said shaft has an annular groove in each of its faces in which said stops and cooperating projections are nested, whereby great compactness and simplicity of construction result.

4. A combination such as defined in claim 1 in which said automatic means is capable of being temporarily disabled and said second pawl is then capable of manual operation, whereby the shutter may be operated to produce a time exposure.

5. A device for adjusting the automatic tripping of a two-curtain shutter for cameras comprising, in combination, a shaft and gear wheel fast thereon connected to one curtain, a disc loosely mounted on the end of said shaft for manually rotating the same, a second gear wheel loosely mounted on said shaft, a pawl on a fixed pivot for holding or releasing said second gear wheel, means carried by said disc for releasing said pawl, a notched disc fixed to said shaft, and a pawl pivoted on the first mentioned disc and adapted to engage one or another of said notches, whereby the means for releasing the loosely mounted gear wheel may be adjusted circumferentially with reference to the other gear wheel.

6. A combination such as defined in claim 5 in which said last mentioned pawl has a projection extending through a slot in said first mentioned disc, whereby said pawl may be manipulated to set the trip device or to temporarily disable it.

7. In a shutter winding and releasing mechanism for cameras the combination of a recessed base block, two shutter operating pinions nested therein, two concentric gear wheels also mounted in a recess in said block, one meshing with one pinion and the other with the second pinion, a manually operable winding member mounted in an exterior recess in said block and operatively connected to said gear wheels, and holding pawls cooperating with said gear wheels mounted in interior recesses of said block.

8. A combination such as defined in claim 5 in which the means carried by said first mentioned disc for releasing the pawl holding said second gear wheel comprises an anti-friction wheel journaled on a stud shaft set in the adjacent face of said disc.

9. A structure such as defined in claim 5 in which said first mentioned disc has on its exterior face a circumferentially arranged series of graduated marks, combined with a pointer projecting radially from the end of said shaft and cooperating with said marks; whereby the degree of circumferential adjustment of the trip device and the resultant period of automatic opening of the shutter are visually determinable.

GEORGE WASHINGTON.